US009088769B2

(12) United States Patent
He et al.

(10) Patent No.: US 9,088,769 B2
(45) Date of Patent: Jul. 21, 2015

(54) REDUCED WORST-CASE CONTEXT-CODED BINS IN VIDEO COMPRESSION WITH PARITY HIDING

(75) Inventors: Dake He, Waterloo (CA); Jing Wang, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 533 days.

(21) Appl. No.: 13/535,392

(22) Filed: Jun. 28, 2012

(65) Prior Publication Data

US 2014/0003533 A1     Jan. 2, 2014

(51) Int. Cl.
| | |
|---|---|
| *H04N 7/26* | (2006.01) |
| *H04N 7/12* | (2006.01) |
| *H04N 11/02* | (2006.01) |
| *H04N 11/04* | (2006.01) |
| *H04N 19/00* | (2014.01) |
| *H04N 19/91* | (2014.01) |
| *H04N 19/13* | (2014.01) |
| *H04N 19/60* | (2014.01) |
| *H04N 19/70* | (2014.01) |
| *H04N 19/61* | (2014.01) |

(52) U.S. Cl.
CPC ............... *H04N 19/00* (2013.01); *H04N 7/12* (2013.01); *H04N 7/26* (2013.01); *H04N 11/04* (2013.01); *H04N 11/042* (2013.01); *H04N 19/00775* (2013.01); *H04N 19/13* (2014.11); *H04N 19/61* (2014.11); *H04N 19/70* (2014.11); *H04N 19/91* (2014.11)

(58) Field of Classification Search
CPC .......... H04N 19/00; H04N 7/12; H04N 11/02

USPC ............... 375/240.18, 240.01, 240.12, 240.2, 375/240.25, 51, E7.026, E70.27, E7.231
See application file for complete search history.

(56) References Cited

U.S. PATENT DOCUMENTS

| | | | | |
|---|---|---|---|---|
| 2008/0219578 | A1* | 9/2008 | Lee | ................................ 382/247 |
| 2013/0003858 | A1* | 1/2013 | Sze | ........................... 375/240.18 |
| 2013/0195182 | A1* | 8/2013 | Kung et al. | .............. 375/240.12 |
| 2013/0272424 | A1* | 10/2013 | Sole Rojals et al. | ...... 375/240.18 |

OTHER PUBLICATIONS

Marpe, H. Schwarz, and T. Wiegand, "Context-based adaptive binary arithmetic coding in the h.264/AVC video compression standard," IEEE Transactions on Circuits and Systems for Video Technology, 13(7):620-636, Jul. 2003.

B. Bross, W-J Han, J-R Ohm, G. J. Sullivan, and T. Wiegand, "WD4: Working Draft 4 of High-Efficiency Video Coding," JCT-VC of ITU-T SG16 WP3 and ISO/IEC JTC1/SC29/WG11, 6th Meeting, Torino, Jul. 2011.

(Continued)

*Primary Examiner* — Jorge L Ortiz Criado
*Assistant Examiner* — Yong Joon Kwon
(74) *Attorney, Agent, or Firm* — Rowand LLP

(57) ABSTRACT

Methods and devices for reconstructing coefficient levels from a bitstream of encoded video data for a coefficient group in a transform unit. Parity hiding is used to signal the parity of the upper left coefficient of the coefficient group. Based on the parity, either the significant coefficient flag or the greater-than-one flag is encoded/decoded for that coefficient, but not both. The greater-than-one flag is encoded/decoded irrespective of whether a maximum number of greater-than-one flags have been encoded/decoded with respect to the other coefficients in the coefficient group.

27 Claims, 5 Drawing Sheets

(56) References Cited

OTHER PUBLICATIONS

F. Bossen, "Common test conditions and software reference configurations", JCTVC-F900, JCT-VC of ITU-T SG16 WP3 and ISO/IEC JTC1/SC29/WG11, 6th Meeting, Torino, Jul. 2011.

T. Nguyen, T. Winken, D. Marpe et al., "Reduced-complexity entropy coding of transform coefficient levels using a combination of VLC and PIPE", JCTVC-D336, JCT-VC of ITU-T SG16 WP3 and ISO/IEC JTC1/SC29/WG11, 4th Meeting, Daegu, Jan. 2011.

G. Clare, F. Henry, and J. Jung, "Sign Data Hiding", JCTVC-G271.

J. Sole, R. Joshi, M. Marczewicz, "Non-CE11: Diagonal sub-block scan for HE residual coding", JCTVC-G323.

N. Nguyen, T. Ji, D. He, G. Martin-Cocher, L. Song, "Multi-level significance maps for large transform units", JCTVC-G644.

Benjamin Bross, et al. "WD5: Working Draft 5 of High-Efficiency Video Coding" JCTVC-G1103_d4.

Joel Sole, et al., JCTVC-I0326, Joint Collaborative Team on Video Coding (JCT-VC),, "Signal Data Hiding Simplification and Enhancement".

EPO, European Extended Search Report relating to application No. 12174016.1 dated Nov. 22, 2012.

Nguyen, N et al: "Adaptive Thresholds for Greater-than-1 and Greater-than-2 Flags", 9. JCT-VC Meeting; 100 MPEG Meeting; Apr. 27, 2012-Jul. 5, 2012; Geneva; (Joint Collaborative Team on Video Coding of ISO/IEC JTC1/SC29/WG11 and ITU-T SG.16); URL: Http://Wftp3.Itu.Int/Av-Arch/Jctvc-Site/,, No. JCTVC-I0281, Apr. 17, 2012, XP030112044.

Sole J et al: "Sign data hiding simplification and enhancement", 9. JCT-VC Meeting; 100. MPEG Meeting; Apr. 27, 2012-Jul. 5, 2012; Geneva; (Joint Collaborative Team on Video Coding of ISO/IEC JTC1/SC29/WG11 and ITU-T SG. 16); URL: Http://Wftp3.Itu.Int/Av-Arch/Jctvc-Site/,, No. JCTVC-I0326, Apr. 17, 2012, XP030112089.

* cited by examiner

REDUCED WORST-CASE CONTEXT-CODED BINS IN VIDEO COMPRESSION WITH PARITY HIDING

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present application generally relates to data compression and, in particular, to methods and devices for encoding and decoding transform coefficients, specifically in the case of video coding.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU termed High Efficiency Video Coding (HEVC). The initiative may eventually result in a video-coding standard that will form part of a suite of standards referred to as MPEG-H.

There are a number of standards for encoding/decoding images and videos, including H.264, that use block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that HEVC will also have these features.

When spectrally transforming residual data, many of these standards prescribe the use of a discrete cosine transform (DCT) or some variant thereon. The resulting DCT coefficients are then quantized using a quantizer to produce quantized transform domain coefficients, or indices.

The block or matrix of quantized transform domain coefficients (sometimes referred to as a "transform unit") is then entropy encoded using a particular context model. In H.264/AVC and in the current development work for HEVC, the quantized transform coefficients are encoded by (a) encoding a last significant coefficient position indicating the location of the last non-zero coefficient in the transform unit, (b) encoding a significance map indicating the positions in the transform unit (other than the last significant coefficient position) that contain non-zero coefficients, (c) encoding the magnitudes of the non-zero coefficients, and (d) encoding the signs of the non-zero coefficients. This encoding of the quantized transform coefficients often occupies 30-80% of the encoded data in the bitstream.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
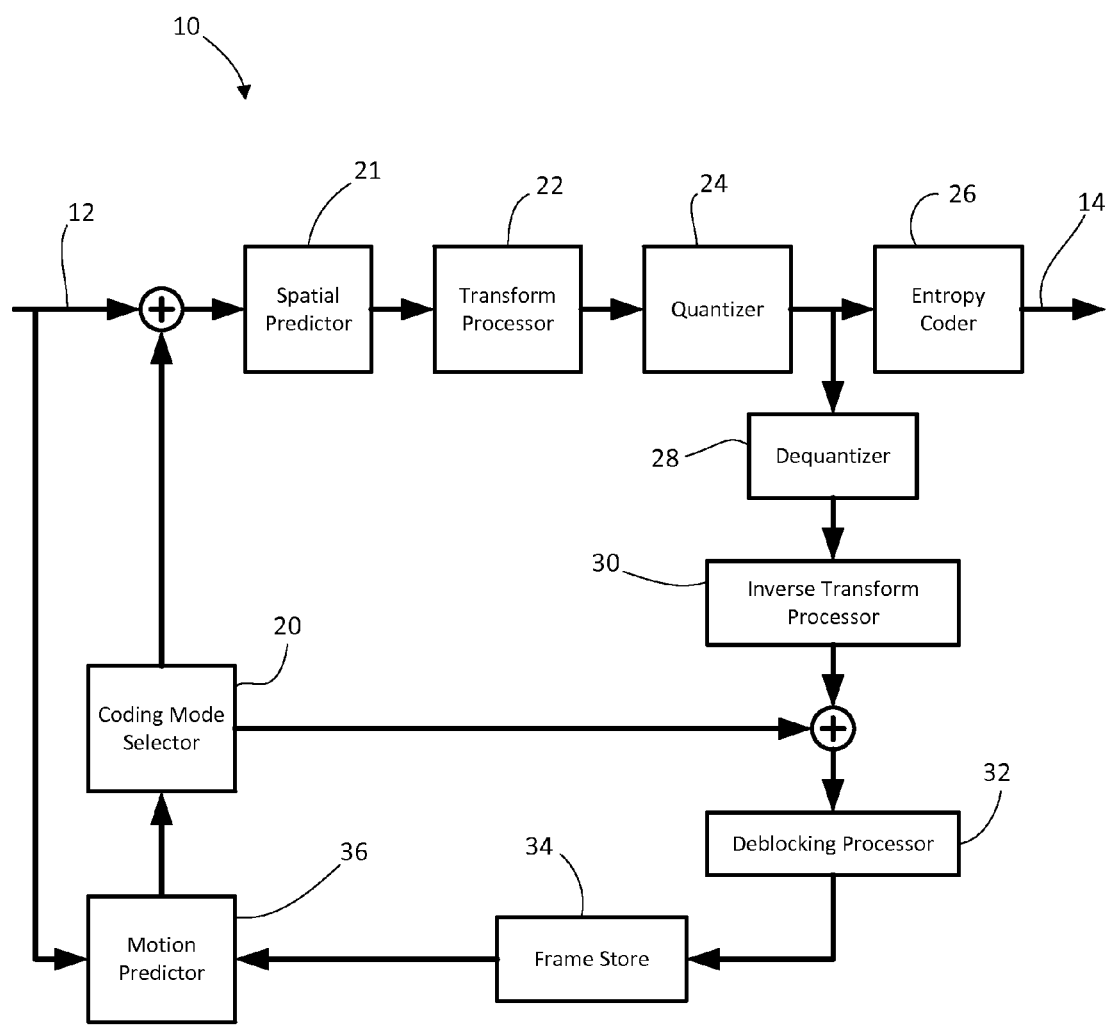
FIG. 1 shows, in block diagram form, an encoder for encoding video.

The present application describes methods and encoders/decoders for encoding and decoding residual video data. In particular, the present application discloses methods and devices for reconstructing coefficient levels from a bitstream of encoded video data for a coefficient group in a transform unit. Parity is used to hide information regarding the upper left coefficient, which is the last coefficient in the coefficient group processed in the scan order. The decoding of a significant-coefficient flag for the upper left coefficient and the decoding of a greater-than-one flag for the upper left coefficient are conditional upon the parity of the upper left coefficient, and irrespective of whether a threshold number of greater-than-one flags were decoded for the other coefficients of the coefficient group.

In a first aspect, the present application describes method of decoding a bitstream of encoded video to reconstruct coefficients of a coefficient group in a video decoder, the coefficient group including an upper left coefficient. The method includes decoding flags for reconstructing the coefficients of the coefficient group other than the upper left coefficient, wherein decoding includes, for each non-zero coefficient, decoding a greater-than-one flag if the number of previously decoded greater-than-one flags for the coefficient group is less than a predetermined threshold number; determining a parity of the upper left coefficient; decoding a significant-coefficient flag for the upper left coefficient only if the parity is even; and decoding a greater-than-one flag for the upper left coefficient only if the parity is odd and irrespective of the predetermined threshold number.

The present application further discloses a method of encoding video in a video encoder to output a bitstream of encoded data, the video including a coefficient group including an upper left coefficient. The method includes encoding a parity of the upper left coefficient; encoding flags for the coefficients of the coefficient group other than the upper left coefficient, wherein encoding includes, for each non-zero coefficient other than the upper left coefficient, encoding a greater-than-one flag if the number of previously encoded greater-than-one flags for the coefficient group is less than a predetermined threshold number; encoding a significant-coefficient flag for the upper left coefficient only if the parity is even; and encoding a greater-than-one flag for the upper left coefficient only if the parity is odd and irrespective of the predetermined threshold number.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264 standard for video coding and/or the developing HEVC standard. Those ordinarily skilled in the art will understand that the present application is not limited to H.264/AVC or HEVC but may be applicable to other video coding/decoding standards, including possible future standards, multi-view coding standards, scalable video coding standards, and reconfigurable video coding standards.

In the description that follows, when referring to video or images the terms frame, picture, slice, tile and rectangular slice group may be used somewhat interchangeably. Those of skill in the art will appreciate that, in the case of the H.264 standard, a frame may contain one or more slices. The term "frame" may be replaced with "picture" in HEVC. Other terms may be used in other video coding standards. It will also be appreciated that certain encoding/decoding operations might be performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to transform units, coding units, groups of coding units, etc., as will become apparent in light of the description below.

Figure 2:
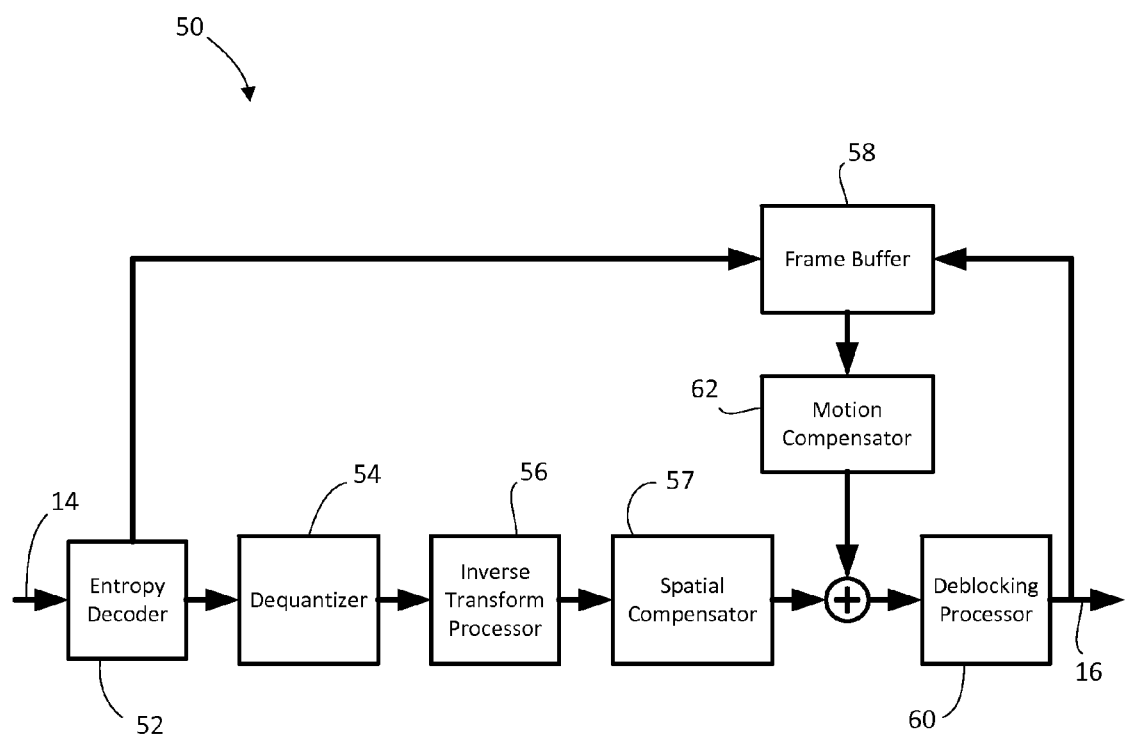
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, like HEVC.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks, coding units, etc.) within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform or others may be used in some instances. The block-based transform is performed on a coding unit, macroblock or sub-block basis, depending on the size of the macroblocks or coding units. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered as a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

The block or matrix of quantized transform domain coefficients may be referred to herein as a "transform unit" (TU). In some cases, the TU may be non-square, e.g. a non-square quadrature transform (NSQT).

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. The deblocking processor 32 may include a deblocking processor and a filtering processor. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks or coding units to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing video encoders.

The decoder 50 includes an entropy decoder 52, dequantizer 54, inverse transform processor 56, spatial compensator 57, and deblocking processor 60. The deblocking processor 60 may include deblocking and filtering processors. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock or coding unit, the recreated "video data" is the residual data for use in spatial compensation relative to a previously decoded block within the frame. The spatial compensator 57 generates the video data from the residual data and pixel data from a previously decoded block. In other cases, such as inter-coded macroblocks or coding units, the recreated "video data" from the inverse transform processor 56 is the residual data for use in motion compensation relative to a reference block from a different frame. Both spatial and motion compensation may be referred to herein as "prediction operations".

The motion compensator 62 locates a reference block within the frame buffer 58 specified for a particular inter-coded macroblock or coding unit. It does so based on the reference frame information and motion vector specified for the inter-coded macroblock or coding unit. It then supplies the reference block pixel data for combination with the residual data to arrive at the reconstructed video data for that coding unit/macroblock.

A deblocking/filtering process may then be applied to a reconstructed frame/slice, as indicated by the deblocking processor 60. After deblocking/filtering, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

It is expected that HEVC-compliant encoders and decoders will have many of these same or similar features.

Quantized Transform Domain Coefficient Encoding and Decoding

The present application describes example processes and devices for encoding and decoding transform coefficients of a transform unit. The non-zero coefficients are identified by a significance map. A significance map is a block, matrix, group, or set of flags that maps to, or corresponds to, a transform unit or a defined unit of coefficients (e.g. several transform units, a portion of a transform unit, or a coding unit). Each flag indicates whether the corresponding position in the transform unit or the specified unit contains a non-zero coefficient or not. In existing standards, these flags may be referred to as significant-coefficient flags. In existing standards, there is one flag per coefficient from the DC coefficient to the last significant coefficient in a scan order, and the flag is a bit that is zero if the corresponding coefficient is zero and is set to one if the corresponding coefficient is non-zero. The term "significance map" as used herein is intended to refer to a matrix or ordered set of significant-coefficient flags for a transform unit, as will be understood from the description below, or a defined unit of coefficients, which will be clear from the context of the applications.

The significance map may be converted to a vector in accordance with the scan order (which may be vertical, horizontal, diagonal, zig-zag, or any other scan order permitted under the applicable standard). The scan is typically done in "reverse" order, i.e. starting with the last significant coefficient and working back through the significant map in reverse direction until the significant-coefficient flag in the upper-left corner at [0,0] is reached. In the present description, the term "scan order" is intended to mean the order in which flags, coefficients, or groups, as the case may be, are processed and may include orders that are referred to colloquially as "reverse scan order".

Each significant-coefficient flag is then entropy encoded using the applicable context-adaptive coding scheme. For example, in many applications a context-adaptive binary arithmetic coding (CABAC) scheme may be used.

The magnitudes for those non-zero coefficients may then be encoded. In some standards, magnitudes (i.e. levels) are encoded by encoding one or more level flags. If additional information is required to signal the magnitude of a quantized transform domain coefficient, then remaining-level data may be encoded. In one example implementation, the levels may be encoded by first encoding a map of greater-than-one flags indicating which non-zero coefficients having an absolute value level greater than one. Greater-than-two flags may then be encoded to indicate which non-zero coefficients have a level greater than two. Remaining level data may then be encoded for any of the coefficients having an absolute value greater than two. The value encoded in the remaining-level integer may be the actual value minus three. The sign of each of the non-zero coefficients is also encoded. Each non-zero coefficient has a sign bit indicating whether the level of that non-zero coefficient is negative or positive.

In some implementations a transform unit may be partitioned into contiguous and non-overlapping coefficient groups. The coefficients within each coefficient group may be processed in a scan order, e.g. diagonal, before processing the next coefficient group in a group-scan order (which may also be diagonal, or any other selected order). Coefficient groups may be square, e.g. 4×4, or non-square, e.g. 2×8, 8×2, etc. In some cases, coefficient groups may vary in size and may be oriented/aligned with a scan order, e.g. diagonally.

Coefficient groups sometimes may be used to implement multi-level coding, such as through the use of significant-coefficient group flags. A significant-coefficient group flag indicates whether the associated coefficient group should be presumed to have non-zero coefficients or whether all coefficients may be presumed to be zero (and thus no further data need be encoded/decoded for that coefficient group).

Some prior work has focused on sign bit hiding. U.S. patent application Ser. No. 13/354,465 was filed Jan. 20, 2012, and is entitled "Multiple Sign Bit Hiding within a Transform Unit". The earlier work focused on dividing coefficients into non-overlapping sets and hiding one bit per set. The sign of one of the coefficients in the set is hidden in the parity of the sum of the absolute value of the coefficients in the set. Accordingly, at the encoder if the parity of the sum does not match the sign, then the value of one of the coefficients in the set is adjusted up or down to force the party to correspond to the sign. In one example, the coefficients are divided into non-overlapping sets of sixteen corresponding to the coefficient groups into which a transform unit is divided. The contents of U.S. application Ser. No. 13/354,465 are hereby incorporated by reference.

U.S. patent application Ser. No. 13/524,117 was filed Jun. 15, 2012, and is entitled "Multi-bit Information Hiding using Overlapping Subsets". This application describes the hiding of multiple sign bits in a single coefficient group based on parity values determined using overlapping subsets of coefficients. The application also discloses a number of example conditions for enabling information hiding using parity. The contents of U.S. application Ser. No. 13/524,117 are hereby incorporated by reference.

In accordance with one aspect of the present application, parity of the upper left coefficient is a condition for determining whether to encode/decode a significant-coefficient flag for the upper left coefficient and/or a greater-than-one flag for the upper left coefficient. The parity of the upper left coefficient may be signaled by the parity of the sum of absolute values of the other coefficients in the coefficient group (e.g. coefficients 1 to 15). Various conditions may be applied to determine whether parity hiding is enabled for a particular coefficient group.

With the maximum number of greater-than-one flags set at eight, parity hiding for the upper left coefficient still results in a worst-case number of context-coded bins of 25. Worst-case situations are typically assessed on the basis of the maximum number of context-coded bins required to encode a coefficient group. Using this measure, the worst case is sixteen significant-coefficient flags, eight greater-than-one flags, and one greater-than-two flag: 16+8+1=25.

In accordance with one aspect of the present application, parity hiding may be leveraged to improve the worst-case scenario without sacrificing compression efficiency. In one aspect, the threshold maximum number of greater-than-one flags is applied to the coefficients of the coefficient group other than the upper left coefficient (e.g. the DC coefficient). This allows us to reduce the threshold maximum. In one example, the maximum number of greater-than-one flags is reduced from eight to seven, although other maximums may be used in other embodiments. Parity hiding is used to code the flags of the upper left coefficient. In particular, if the parity of the upper left coefficient is even, then the greater-than-one flag of the upper left coefficient is not encoded/decoded. If the parity of the upper left coefficient is odd, then the significant-coefficient flag of the upper left coefficient is not encoded/decoded. Notably, the greater-than-one flag is encoded/decoded when the parity is odd irrespective of whether the maximum number of greater-than-one flags has been reached with respect to the other coefficients of the coefficient group. That is, the greater-than-one flag of the upper left coefficient, if encoded/decoded, is not counted against the maximum number of greater-than-one flags for the coefficient group.

This scheme results in a worst-case throughput of 24. When parity hiding is enabled and the upper left coefficient is even, the worst case is sixteen significant coefficient flags, seven greater-than-one flags, and one greater-than-two flag: 16+7+1=24. When parity hiding is enabled and the upper left coefficient is odd, the worst case is fifteen significant coefficient flags, eight greater-than-one flags (one for the upper left coefficient and a maximum of seven in the remainder of the coefficient group), and one greater-than-two flag: 15+(7+1)+1=24.

Figure 3:
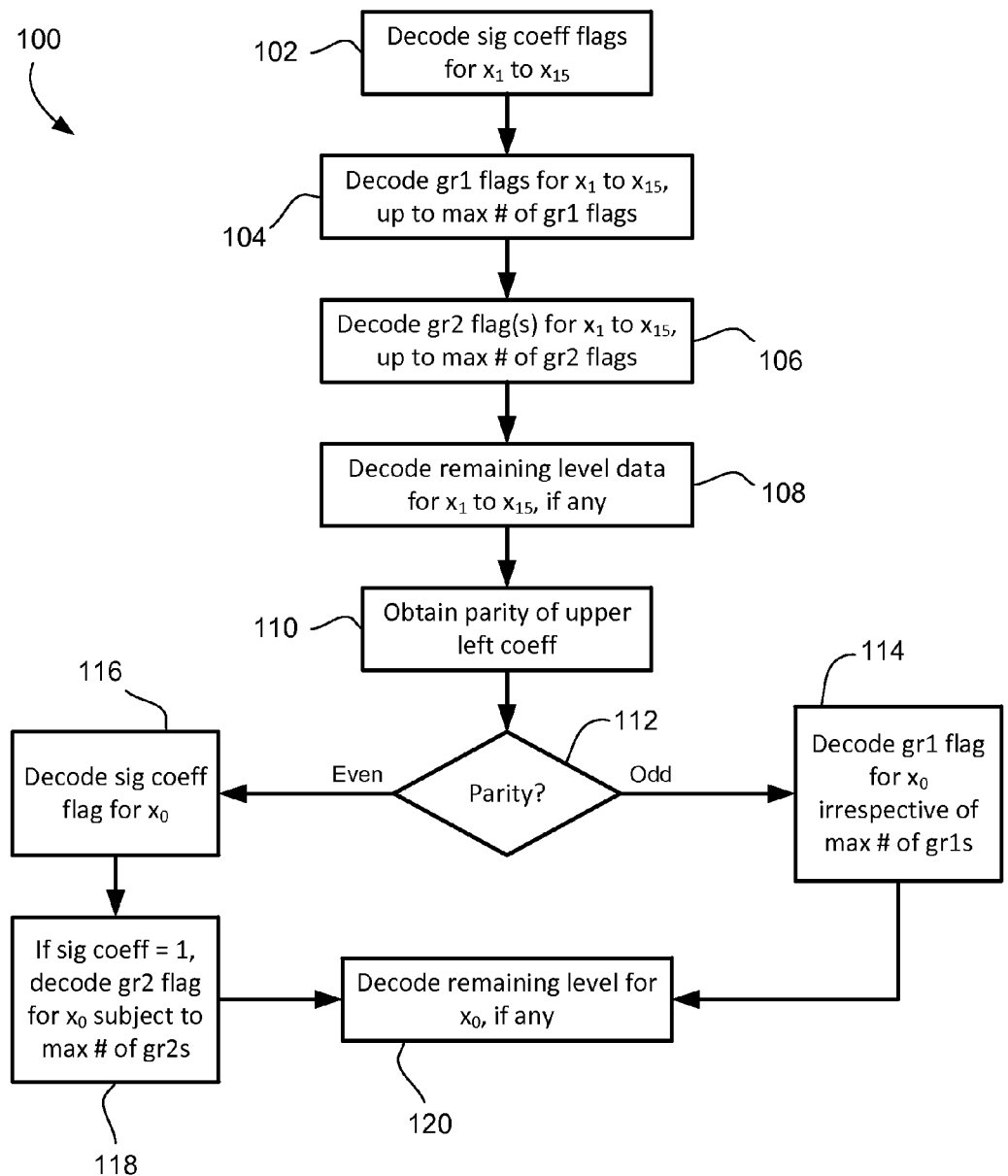
FIG. 3 shows, in flowchart form, an example process for decoding encoded video with parity hiding.

Reference is now made to FIG. 3, which shows in flowchart form an example process 100 for decoding a bitstream of encoded data to reconstruct quantized transform domain coefficients. The process 100 may be carried out by a video decoder, which may be implemented by a computing device, including a general purpose computing devices (for example, a tablet, laptop, desktop, mobile communications device, or set-top box) executing a video decoding application.

The process 100 is executed to decode a bitstream of encoded data. The bitstream may be obtained through a network connection, for example. In another example, the bitstream may be obtained from a stored computer-readable media (e.g. a memory element, such as a disc, flash drive, memory card, RAM, ROM, or other memory).

In this example, the process 100 is applied to reconstruct the coefficients of a 4×4 coefficient group containing sixteen coefficients processed in a scan order from the lower right coefficient to the upper left coefficient. The scan order may be diagonal in some cases (or horizontal, vertical, zig zag, or other such scan orders). Processing of coefficients from bottom right to upper left is sometimes referred to colloquially as "reverse" scan order.

The process 100 includes decoding the significant coefficient flags for the first fifteen coefficients in scan order, i.e. coefficients $x_{15}$, $x_{14}$, $x_{13}$, . . . , $x_1$, in operation 102. This excludes the upper left coefficient, $x_0$. In operation 104, greater-than-one flags for any non-zero coefficients amongst the first fifteen coefficients, $x_{15}$ to $x_1$, are decoded subject to a threshold maximum number of greater-than-one flags. In this example, the threshold may be a maximum of seven greater-than-one flags for the coefficients $x_{15}$ to $x_1$ per coefficient group. Operation 106 involves decoding greater-than-two flags for any coefficients in coefficients $x_{15}$ to $x_1$ that are greater-than-one, subject to a threshold maximum number of greater-than-two flags, which in this case may be set to 1. Operation 108 involves decoding remaining level data for coefficients $x_{15}$ to $x_1$. The decoding of significant-coefficient flags, greater-than-one flags, greater-than-two flags, and remaining level data for coefficients $x_{15}$ to $x_1$ provides the decoder with the magnitudes of each of the first fifteen coefficients of the coefficient group.

In operation 110, the decoder obtains a parity value for the upper left coefficient, $x_0$. In some embodiments the parity value is a hidden parity based on the previously decoded/reconstructed coefficients of the coefficient group. The parity may be hidden in the parity of the sum of the absolute value of coefficients $x_{15}$ to $x_1$, for example. The parity may be hidden in other ways and using fewer than all of coefficients $x_{15}$ to $x_1$. In one case that will be described later below, the parity is signaled in the bitstream by a flag that the decoder decodes. In this example, however, it is presumed that the decoder obtains the parity value from the parity of the sum of absolute values of coefficients $x_{15}$ to $x_1$.

In operation 112, the decoder assesses whether the parity value of the upper left coefficient is odd or even. In other words, the decoder determines whether the upper left coefficient has an odd magnitude or an even magnitude. If odd, then the decoder knows that the upper left coefficient cannot be 0, so a significant-coefficient flag would have been redundant, and the decoder knows that a significant-coefficient flag is not coded in the bitstream. Accordingly, the decoder decodes a greater-than-one flag in operation 114. The greater-than-one flag indicates whether the upper left coefficient is 1 or whether it is 3 or higher. Note that a greater-than-two flag does not need to be coded in this instance either, since if the greater-than-one flag equals 1, then the upper left coefficient is necessarily greater-than-two. Also note that the greater-than-one flag for the upper left coefficient is decoded irrespective of whether the maximum number of greater-than-one flags has already been reached with respect to the decoding of those flags for coefficients $x_{15}$ to $x_1$ in operation 104. That is, the greater-than-one flag for the upper left coefficient is always encoded/decoded when parity hiding is enabled and the parity value is odd.

Once the greater-than-one flag is decoded in operation 114, then the decoder decodes remaining level data, if necessary, in operation 120. The remaining level data may code the magnitude of the coefficient minus three (since it is known that the value is at least three). In some cases, because the coefficient is known to be odd, the remaining level data decoded in operation 120 may be the remaining-level-minus-three mod 2. Other mechanisms for signaling the remaining level data will be appreciated.

If, in operation 112, it is determined that the parity of the upper left coefficient is even, then in operation 116 the decoder decodes a significant-coefficient flag for the upper left coefficient. In operation 118, if the significant-coefficient flags is 1, the decoder decodes a greater-than-two flag subject to the maximum threshold number of greater-than-two flags. It will be appreciated that if the significant-coefficient flag is 1, then the upper left coefficient is known to be 2 or 4 (or higher). Accordingly, a greater-than-one flag is not necessary. The greater-than-two flag (if encoded) signals whether the magnitude of the upper left coefficient is 2 or whether it is 4 or higher. After operation 118 the decoder decodes remaining level data for the upper left coefficient (if any) in operation 120. As noted above, the remaining level data may be encoded in a manner that takes into account the fact that the coefficient is known to be even.

It will be understood that some of the foregoing described operations may be split into separate operations in another example embodiment, and some of the separate operations may be combined or reordered in some embodiments.

The described process 100 imposes a threshold maximum number of greater-than-one flags upon the first fifteen coefficients $x_{15}$ to $x_1$, and then requires decoding of a greater-than-one flag for the upper left coefficient irrespective of whether the maximum number was reached if the upper left coefficient is known to be odd from the parity determination. In some example embodiments, the number of coefficients in the set or group being decoded may be more or less than sixteen, and the process may be adapted accordingly.

The process at the encoder is largely similar to the process at the decoder, except that the encoder knows whether the upper left coefficient is even or odd and may need to adjust one of the other coefficients in the coefficient group (i.e. one of $x_{15}$ to $x_1$), in order for the parity value to match the parity of the upper left coefficient. Various rate-distortion optimization techniques may be used to determine which coefficient to adjust. The encoder encodes the flags and remaining level data for coefficients $x_{15}$ to $x_1$, subject to the maximum threshold number of particular flags. The encoder then encodes either a significant-coefficient flag or a greater-than-one flag for the upper left coefficient, depending on its parity. A greater-than-two flag, if applicable, may then be encoded (if the parity is even and the significant coefficient flag equals 1), and remaining level data (if any) may be encoded.

Context Coding of Upper Left Greater-than-one Flag

In the above-described encoding and decoding process, the coding of the greater-than-one flags is context-based. The greater-than-one flags for coefficients $x_{15}$ to $x_1$ indicate whether that coefficient is 1 or greater than or equal to 2. For the upper left coefficient, however, the greater-than-one flag indicates whether the upper left coefficient is 1 or greater than or equal to 3. Accordingly, the probability distribution with respect to this flag may be different than the regular greater-than-one flags.

As a result, in some embodiments, an additional set of contexts may be defined for coding the greater-than-one flag of the upper left coefficient. The context may be based on the position of the coefficient in the transform unit, in some embodiments. For example, the context (ctxInc) for coding the greater-than-one flag for the upper left coefficient in a coefficient group may be determined as follows:

```
If posX + posY == 0
    ctxInc = Context 1
Else
    ctxInc = Context 2
```

In this example, posX and posY indicate the x, y position of the upper left coefficient relative to the upper left corner of the transform unit (which may contain multiple coefficient groups, depending on its size). These two additional contexts may be used for both luma and chroma. In another example, a separate set of two contexts may be defined for luma and for chroma, i.e. four new contexts.

In another example, the context for coding the greater-than-one flag for the upper left coefficient in a coefficient group is determined as follows:

If parity hiding is enabled, and the upper left coefficient is odd:

```
If posX + posY == 0
    ctxInc = Context 1
Else
    ctxInc = Context 2
Else
    If posX + posY == 0
        ctxInc = Context 3
    Else
        ctxInc = Context 4
```

Note that in this example, context 1 is used for coding the greater-than-one flag of the upper left coefficient when parity hiding and when in position [0, 0] of the TU. If not in position [0, 0], then context 2 is used. If parity hiding is not used, then context 3 is used for coding the greater-than-one flag of the upper left coefficient when in position [0, 0], and context 4 otherwise.

In yet another example, if parity hiding is not used then the greater-than-one flag of the upper left coefficient is coded as per usual using the context set otherwise used for coding greater-than-one flags, as indicated by the following pseudo-code:

```
If parity hiding is enabled, and the upper left coefficient is odd:
    If posX + posY == 0
        ctxInc = Context 1
    Else
        ctxInc = Context 2
Else
    Use normal contexts
```

In yet another example, if parity hiding is not used or there is at least one coefficient that is greater than one in the first fifteen coefficients then the greater-than-one flag of the upper left coefficient is coded as per usual using the context set otherwise used for coding greater-than-one flags, as indicated by the following pseudo-code:

If parity hiding is enabled, and the upper left coefficient is odd, and none of the first fifteen coefficients are greater than one:

```
If posX + posY == 0
    ctxInc = Context 1
Else
    ctxInc = Context 2
Else
    Use normal contexts
```

Other processes may be employed by the encoder/decoder for determining context for encoding/decoding the greater-than-one flags in some other embodiments.

Coded Parity Value

As described above, in many embodiments the parity of the upper left coefficient may be determined based upon a parity value calculation involving one or more of the other coefficients in the coefficient group. However, in another embodiment the parity of the upper left coefficient is explicitly signaled in the bitstream. That is, the parity is encoded as a separate syntax element. Example pseudo-code illustrating one embodiment of such a process is as follows:

```
Decode( parity(x) == 0 )         // parity of x (0: even, 1: odd)
If( parity(x) == 0 )
{
```

-continued

```
    Decode( |x| > 0 )            // significance flag of x
    If( |x| > 0 )
    {
        Decode( |x| > 2 )        // greaterTwo flag of |x|
        Decode( sign(x) )        // sign of x
        If( |x| > 2 )
        {
            Decode( (|x| – 4)/2 )    // remaining level of |x|
        }
    }
}
else
{
    Decode( |x| > 1 )            // greaterOne flag of |x|
    Decode( sign(x) )            // sign of x
    If( |x| > 1 )
    {
        Decode( (|x| – 3)/2 )    // remaining level of |x|
    }
}
```

From a binarization point of view, the parity decoding process set out above describes a more balanced Huffman tree, which is more efficient if the probability distribution of the coefficient values is biased towards large numbers. This may be the case, for example, with the DC coefficient. The following exemplary criterion may be used to identify coefficient groups with such probability distributions so that the parity decoding process may be applied:

```
If the current CG is the first CG in the TU and the total number of non-
zero coefficients >= 2
    Apply parity decoding
Else
    Apply regular coefficient decoding
```

In some embodiments, the parity decoding process may also be unified with sign bit hiding. Example pseudo-code illustrating one embodiment of such unification is as follows:

```
If the current CG is the first CG in the TU and the total number of non-
zero coefficients >= 2
    Apply parity decoding
Else if (the current CG is the last CG in the TU and lastNZPosInCG –
firstNZPosInCG >= 4) or (the current CG is not the last CG in the TU
and the total number of non-zero coefficients >= 2)
    Apply sign bit hiding
Else
    Regular coefficient decoding
```

The following pseudo-code illustrates one example implementation of parity hiding in a video decoding process. In this example, the parity of the first coefficient is hidden per coefficient group. That hidden parity is then used to determine whether the decoder decodes a significant coefficient flag or a greater-than-one flag. The decoding of greater-than-one flags with respect to the first fifteen coefficients is subject to maximum of seven, as indicated by "if(numSigCoeff<7) . . . ".

| residual_coding( x0, y0, log2TrafoWidth, log2TrafoHeight, scanIdx, cIdx ) { | Descriptor |
|---|---|

```
    // decode last significant coefficient information
    // decode significant-coefficient group flag
    // decode significant-coefficient flags for n = 15 to 1, i.e. excluding first position in CG
    numSigCoeff = 0
    firstGreater1CoeffIdx = –1
    for( n = 15; n >= 1; n– – ) {
        xC = ScanOrder[ log2TrafoWidth ][ log2TrafoHeight ][ scanIdx ][ n + offset ][ 0 ]
        yC = ScanOrder[ log2TrafoWidth ][ log2TrafoHeight ][ scanIdx ][ n + offset ][ 1 ]
```

```
residual_coding( x0, y0, log2TrafoWidth, log2TrafoHeight, scanIdx, cIdx ) {                      Descriptor
            if( significant_coeff_flag[ xC ][ yC ] ) {
                if( numSigCoeff < 7 ) {
                    coeff_abs_level_greater1_flag[ n ]                                           ae(v)
                    numSigCoeff++
                    if( coeff_abs_level_greater1_flag[ n ] && firstGreater1CoeffIdx = = −1 )
                        firstGreater1CoeffIdx = n
                }
            }
        }
        lastCoeffPos = numCoeff − 1 − (numLastSubset << 4)
        parityHidden = ( i < numLastSubset ? ( numSigCoeff >= 1 ) : ( lastCoeffPos >= 4 )
        // decode gr2 flag (if there was a gr1 flag = 1 in first fifteen coefficients)
        // decode signs for n = 15 to 1
        numSigCoeff = 0
        sumAbs = 0
        for( n = 15; n >= 0; n− − ) {
            xC = ScanOrder[ log2TrafoWidth ][ log2TrafoHeight ][ scanIdx ][ n + offset ][ 0 ]
            yC = ScanOrder[ log2TrafoWidth ][ log2TrafoHeight ][ scanIdx ][ n + offset ][ 1 ]
            if( n == 0 && significant_coeff_group_flag[ xCG ][ yCG ] ) {
                firstParity = ( ( sumAbs%2 == 1 ) ? 0 : 1 )
                if( offset < (numCoeff−1) && numSigCoeff > 0 &&
                    ( !(data_hiding_flag && parityHidden) || firstParity == 0 ) )
                    significant_coeff_flag[ xC ][ yC ]                                           ae(v)
                if( significant_coeff_flag[ xC ][ yC ] ) {
                    if( (!data_hiding_flag || !parityHidden || firstParity == 1) )
                        coeff_abs_level_greater1_flag[ n ]                                       ae(v)
                    if( coeff_abs_level_greater1_flag[ n ] && firstGreater1CoeffIdx = = −1 ) {
                        if( !(data_hiding_flag && parityHidden) || firstParity == 0 ) {
                            coeff_abs_level_greater2_flag[ n ]                                   ae(v)
                        }
                    }
                    coeff_sign_flag[ n ]                                                         ae(v)
                }
            }
            if( significant_coeff_flag[ xC ][ yC ] ) {
                baseLevel = 1 + coeff_abs_level_greater1_flag[ n ] +
coeff_abs_level_greater2_flag[ n ]
                if( baseLevel = = ( ( numSigCoeff < 7 || n == 0) ? ( (n = = firstGreater1CoeffIdx) ?
3 : 2 ) : 1 ) )
                    coeff_abs_level_remaining[ n ]                                               ae(v)
                if( n == 0 && data_hiding_flag && parityHidden ) {
                    coeff_abs_level_remaining[ n ] *= 2
                    baseLevel += ( (baseLevel % 2 != firstParity) ? 1 : 0 )
                }
                transCoeffLevel[ x0 ][ y0 ][ cIdx ][ xC ][ yC ] =
                    ( coeff_abs_level_remaining[ n ] + baseLevel ) * ( 1 − 2 * coeff_sign_flag[ n ] )
                if( sign_data_hiding_flag && parityHidden )
                    sumAbs += ( coeff_abs_level_remaining[ n ] + baseLevel )
                numSigCoeff++
            } else
                transCoeffLevel[ x0 ][ y0 ][ cIdx ][ xC ][ yC ] = 0
        }
    }
}
```

It will be understood that the foregoing pseudo-code is but one example implementation. In this example, the significant coefficient flags, greater-than-one flags, greater-than-two flag, and sign bits are decoded for positions 15 to 1 in the coefficient group (excluding the upper left position). Then, in the for-loop detailed above, the remaining level data for positions 15 to 0 is decoded, if any, and within that loop for the upper left position (n=0) the decoder (conditionally) decodes its significant-coefficient flag, greater-than-one flag, and greater-than-two flag, depending on the parity test. Its sign is also decoded. When it comes to decoding the greater-than-one flag for the upper left coefficient, it is conditional upon parity hiding being enabled and the parity being odd. It is not conditional upon whether the maximum number of greater-than-one flags was already reached in the decoding of positions $x_{15}$ to $x_1$.

In one further example, it is observed that when the parity of the coefficient at the first position in a coefficient group or a transform unit is inferred, it might be advantageous to use a different (smaller) quantization step size at that position than the quantization step size used when the parity of the first coefficient is not inferred. In AVC or HEVC, for example, the following quantization scheme might be used:
  when the parity of the coefficient at the first position in a coefficient group or a transform unit is not inferred, the quantization step size might be determined by a quantization parameter Qp; and
  when the parity of the coefficient at the first position in the coefficient group or the transform unit is inferred, the quantization step size might be determined by max(Qp−k, 0), where k is a non-negative integer. When k is equal to 6, the quantization step size is half that determined by Qp when the parity is not inferred.

In the case of scalable video coding, any of the foregoing embodiments may be applied to the base layer encoding/decoding, the enhancement layer encoding/decoding, or both layers.

Figure 4:
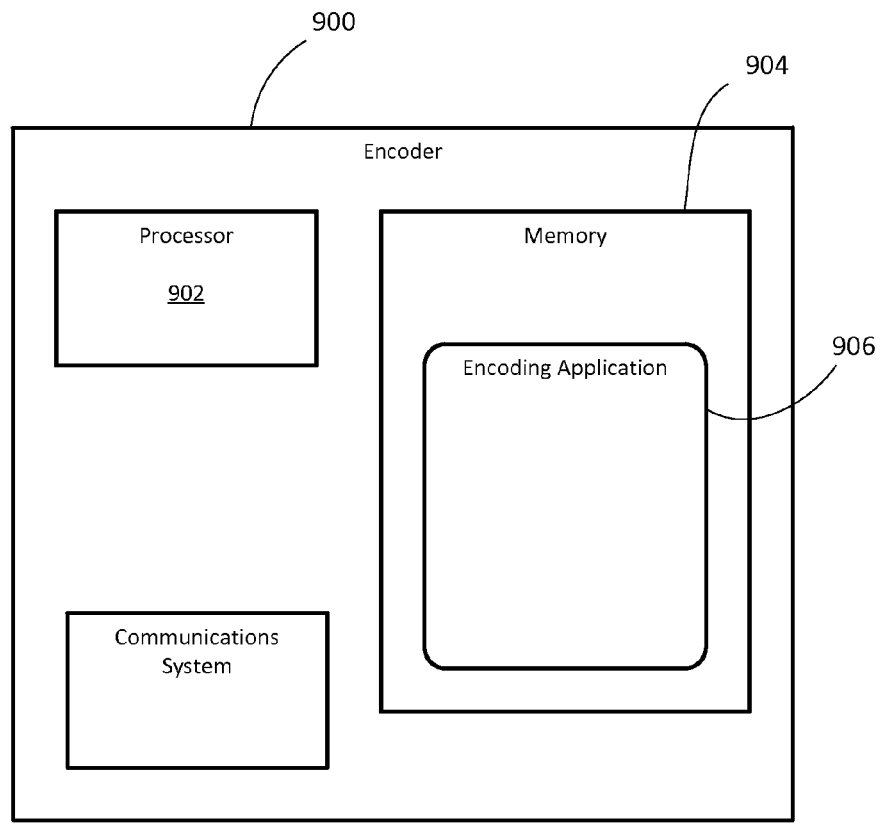
FIG. 4 shows a simplified block diagram of an example embodiment of an encoder.

Reference is now made to FIG. 4, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the processes described herein. It will be understood that the encoding application 906 may be stored in on a computer readable medium, such as a compact disc, flash memory device, random access memory, hard drive, etc.

Figure 5:
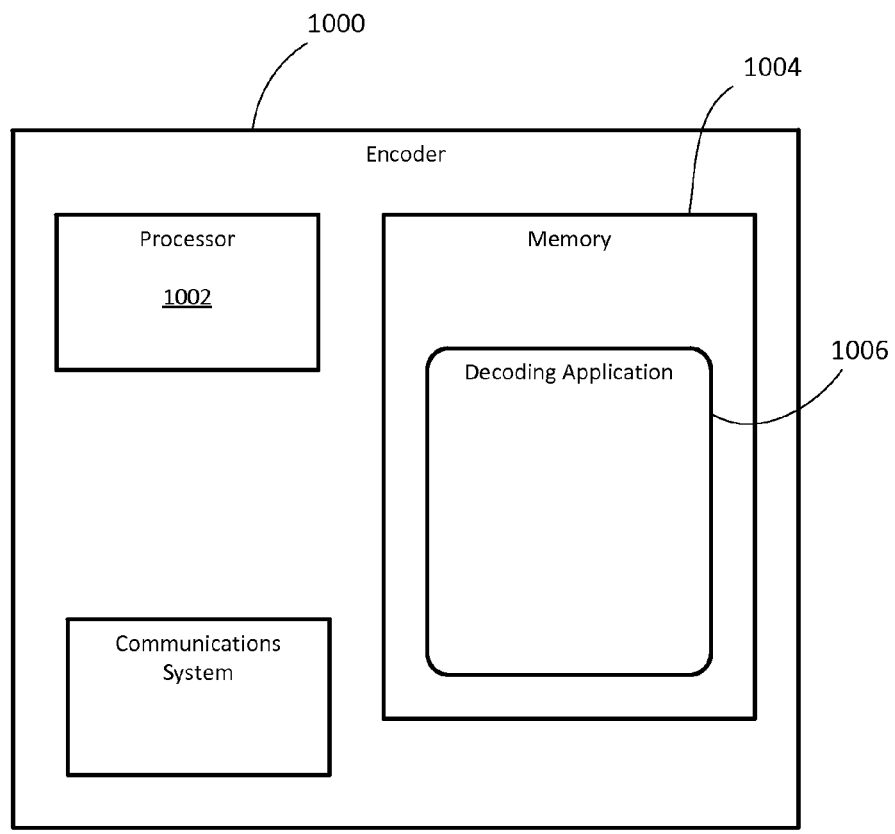
FIG. 5 shows a simplified block diagram of an example embodiment of a decoder.

Reference is now also made to FIG. 5, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably-programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding a bitstream of encoded video to reconstruct coefficients of a coefficient group in a video decoder, the coefficient group including an upper left coefficient, the method comprising:
    decoding flags for reconstructing the coefficients of the coefficient group other than the upper left coefficient, wherein decoding includes, for each non-zero coefficient, decoding a greater-than-one flag if the number of previously decoded greater-than-one flags for the coefficient group is less than a predetermined threshold number;
    determining a parity of the upper left coefficient;
    decoding a significant-coefficient flag for the upper left coefficient only if the parity is even; and
    decoding a greater-than-one flag for the upper left coefficient only if the parity is odd and irrespective of the predetermined threshold number.

2. The method claimed in claim 1, wherein the predetermined threshold number is 7.

3. The method claimed in claim 1, wherein determining a parity comprises decoding a parity flag from the bitstream.

4. The method claimed in claim 1, wherein determining a parity is based upon a set of the coefficients of the coefficient group other than the upper left coefficient.

5. The method claimed in claim 1, wherein determining a parity is based upon the parity of a sum of the magnitudes of the coefficients of the coefficient group other than the upper left coefficient.

6. The method claimed in claim 1, further comprising decoding a greater-than-two flag for the upper left coefficient only if:
    the parity is even;
    the significant-coefficient flag is equal to 1; and
    a maximum number of greater-than-two flags has not been decoded when decoding flags for reconstruction the coefficients of the coefficient group other than the upper left coefficient.

7. The method claimed in claim 1, wherein decoding flags for reconstructing the coefficients of the coefficient group other than the upper left coefficient further comprises:
    decoding significant-coefficient flags;
    decoding a greater-than-two flag if at least one greater-than-one flag associated with the coefficients of the coefficient group, other than the upper left coefficient, equals 1; and
    decoding remaining level data, if any.

8. A method of encoding video in a video encoder to output a bitstream of encoded data, the video including a coefficient group including an upper left coefficient, the method comprising:
    encoding a parity of the upper left coefficient;
    encoding flags for the coefficients of the coefficient group other than the upper left coefficient, wherein encoding includes, for each non-zero coefficient other than the upper left coefficient, encoding a greater-than-one flag if the number of previously encoded greater-than-one flags for the coefficient group is less than a predetermined threshold number;
    encoding a significant-coefficient flag for the upper left coefficient only if the parity is even; and
    encoding a greater-than-one flag for the upper left coefficient only if the parity is odd and irrespective of the predetermined threshold number.

9. The method claimed in claim 8, wherein the predetermined threshold number is 7.

10. The method claimed in claim 8, wherein encoding a parity comprises encoding a parity flag that indicates whether the parity is even or odd.

11. The method claimed in claim 8, wherein encoding a parity comprises determining whether the parity matches a parity value determined based upon a set of the coefficients of the coefficient group other than the upper left coefficient and, if not, adjusting at least one of the coefficients to match the parity value to the parity.

12. The method claimed in claim 11, wherein the parity value is based upon the parity of a sum of the magnitudes of the coefficients of the coefficient group other than the upper left coefficient.

13. The method claimed in claim 8, further comprising encoding a greater-than-two flag for the upper left coefficient only if:
- the parity is even;
- the significant-coefficient flag is equal to 1; and
- a maximum number of greater-than-two flags has not been encoded when encoding flags for the coefficients of the coefficient group other than the upper left coefficient.

14. A decoder for decoding a bitstream of encoded video to reconstruct coefficients of a coefficient group in a video decoder, the coefficient group including an upper left coefficient, the decoder comprising:
- a processor;
- a memory; and
- a decoding application stored in memory and containing instructions for configuring the processor to perform the method claimed claim 1.

15. The decoder claimed in claim 14, wherein the predetermined threshold number is 7.

16. The decoder claimed in claim 14, wherein determining a parity comprises decoding a parity flag from the bitstream.

17. The decoder claimed in claim 14, wherein determining a parity is based upon a set of the coefficients of the coefficient group other than the upper left coefficient.

18. The decoder claimed in claim 14, wherein determining a parity is based upon the parity of a sum of the magnitudes of the coefficients of the coefficient group other than the upper left coefficient.

19. The decoder claimed in claim 14, wherein the decoder is further configured to decode a greater-than-two flag for the upper left coefficient only if:
- the parity is even;
- the significant-coefficient flag is equal to 1; and
- a maximum number of greater-than-two flags has not been decoded when decoding flags for reconstruction the coefficients of the coefficient group other than the upper left coefficient.

20. The decoder claimed in claim 14, wherein decoding flags for reconstructing the coefficients of the coefficient group other than the upper left coefficient further comprises:
- decoding significant-coefficient flags;
- decoding a greater-than-two flag if at least one greater-than-one flag associated with the coefficients of the coefficient group, other than the upper left coefficient, equals 1; and
- decoding remaining level data, if any.

21. An encoder for encoding video in a video encoder to output a bitstream of encoded data, the video including a coefficient group including an upper left coefficient, the encoder comprising:
- a processor;
- a memory; and
- an encoding application stored in memory and containing instructions for configuring the processor to perform the method claimed in claim 8.

22. The encoder claimed in claim 21, wherein the predetermined threshold number is 7.

23. The encoder claimed in claim 21, wherein encoding a parity comprises encoding a parity flag that indicates whether the parity is even or odd.

24. The encoder claimed in claim 21, wherein encoding a parity comprises determining whether the parity matches a parity value determined based upon a set of the coefficients of the coefficient group other than the upper left coefficient and, if not, adjusting at least one of the coefficients to match the parity value to the parity.

25. The encoder claimed in claim 24, wherein the parity value is based upon the parity of a sum of the magnitudes of the coefficients of the coefficient group other than the upper left coefficient.

26. The encoder claimed in claim 21, wherein the encoder is further configured to encode a greater-than-two flag for the upper left coefficient only if:
- the parity is even;
- the significant-coefficient flag is equal to 1; and
- a maximum number of greater-than-two flags has not been encoded when encoding flags for the coefficients of the coefficient group other than the upper left coefficient.

27. A non-transitory processor-readable medium storing processor-executable instructions which, when executed, configures one or more processors to perform the method claimed in claim 1.

* * * * *